United States Patent [19]

Reimers

[11] Patent Number: 5,097,796

[45] Date of Patent: Mar. 24, 1992

[54] ANIMAL CAGE AND DOOR LATCH

[75] Inventor: Robert Reimers, Gardner, Kans.

[73] Assignee: Schroer Manufacturing Company, Kansas City, Mo.

[21] Appl. No.: 465,942

[22] Filed: Jan. 16, 1990

[51] Int. Cl.$^5$ .............................................. A01K 31/00
[52] U.S. Cl. ..................................... 119/17; 119/22
[58] Field of Search ................ 119/17, 19; 292/156, 292/161, 162, 163, 302, DIG. 68, DIG. 40, DIG. 56, DIG. 55

[56] References Cited

U.S. PATENT DOCUMENTS

| 1,687,248 | 10/1928 | Hurd | 292/DIG. 56 X |
|---|---|---|---|
| 2,641,494 | 6/1953 | Burris | 292/189 |
| 3,536,044 | 10/1970 | Stephens et al. | 119/17 |
| 4,305,611 | 12/1981 | Robins | 292/341.19 X |
| 4,526,133 | 7/1985 | LoMaglio | 119/17 |
| 4,616,863 | 10/1986 | Bryant | 292/302 |
| 4,856,829 | 8/1989 | Nakamura et al. | 292/DIG. 56 X |
| 4,896,536 | 9/1989 | Kleefeldt | 292/DIG. 56 |
| 4,896,908 | 1/1990 | Kleefeldt | 292/DIG. 56 X |
| 4,917,047 | 4/1990 | Wazeter, III | 119/17 |

Primary Examiner—Gene Mancene
Assistant Examiner—R. Thomas Price
Attorney, Agent, or Firm—Wm. Bruce Day

[57] ABSTRACT

An animal cage having a hinged door with extending horizontal latching pins that engage a latch is disclosed. The latch is provided with sound deadening parts and spacers to provide quiet operation.

5 Claims, 2 Drawing Sheets

ANIMAL CAGE AND DOOR LATCH

BACKGROUND OF THE INVENTION

1. Field of the Invention

The present invention relates to a cage for animals. More particularly, the present invention relates to a latching mechanism for securing the cage door.

2. Description of the Related Art

Animal cages are well known in the art and have many uses, such as transporting pets, transporting wild animals for relocation, housing research animals, and so forth. It is also known to provide an animal cage with a door that is hinged along one side wall, with the hinges typically being attached to the edge of the side wall. The door can be secured in a closed position by a latch fastened to the side wall opposite the hinges.

Latches for this purpose are of many different types and designs. Many of them are noisy and difficult to operate. This shortcoming presents a significant problem in settings such as animal laboratories which may have hundreds of animal cages. Such cages must be opened and closed frequently, adding significantly to the general background noise. In addition, some animals may rattle the cage doors.

Accordingly, there is a need for an animal cage and latching mechanism that reduces the noise generated by opening and closing the cage door.

SUMMARY OF THE INVENTION

Accordingly, it is a primary object of the present invention to provide an animal cage having a hinged door and a latching mechanism that is quieter in operation than those of the prior art.

It is another object of the present invention to provide an animal cage and latching mechanism capable of securing any size animal.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

As required, a detailed description of the preferred embodiment of the present invention is disclosed herein. It is, however, to be understood that the disclosed embodiment is merely exemplary of the invention, which may be embodied in many various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
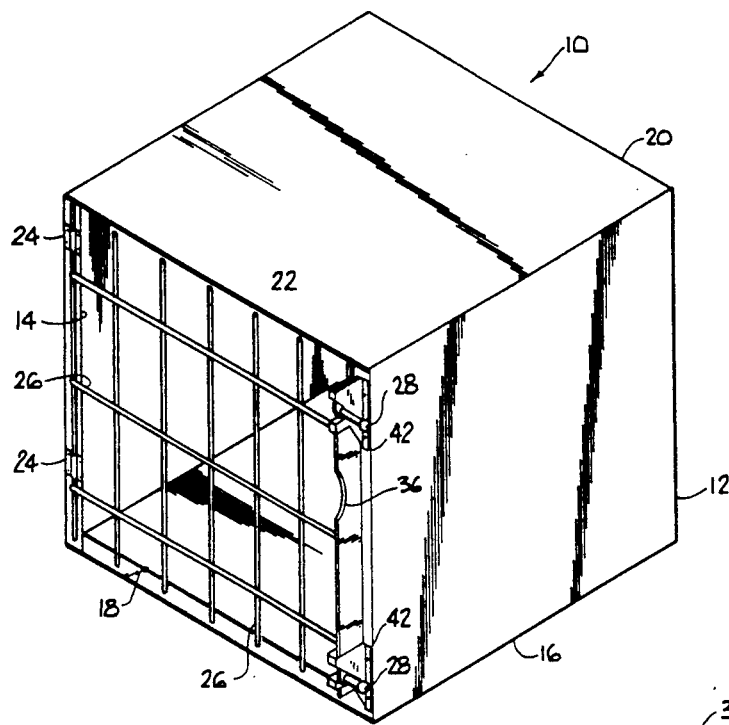
FIG. 1 is a perspective view of an animal cage according to the present invention.

Referring to FIG. 1, there is shown an animal cage 10 having a rear side wall 12, a first side wall 14, a second side wall 16, a bottom wall 18, and a top wall 20 joined together to form a three dimensional cage. The walls may be joined by any conventional fasteners such as bolts or rivets, which may be fastened to internal angle iron members, and so forth. Alternatively, naturally the cage 10 may be a molded structure, such as conventional two-piece pet carriers.

The front of the cage is covered by the door 22 that is connected to the first side wall 14 by the pair of hinges 24 on the hinged edge at the door 22. The door 22 may comprise a mesh of horizontal and vertical bars 26, which may be welded into a grid, woven, and the like. Naturally, the door may be of any desired construction, as may be the side walls. The door 22 further includes two means for engaging a latch on the side of the door opposite from the hinges 24, or latching edge of the door 22. In this particular embodiment, the door 22 includes two latching pins 28 spaced apart from one another and comprising short metal bars welded to the door 22 and extending horizontally therefrom for a short distance, such as two or three inches (five or seven cm), to engage the latch 30 for securing the cage door.

Figure 2:
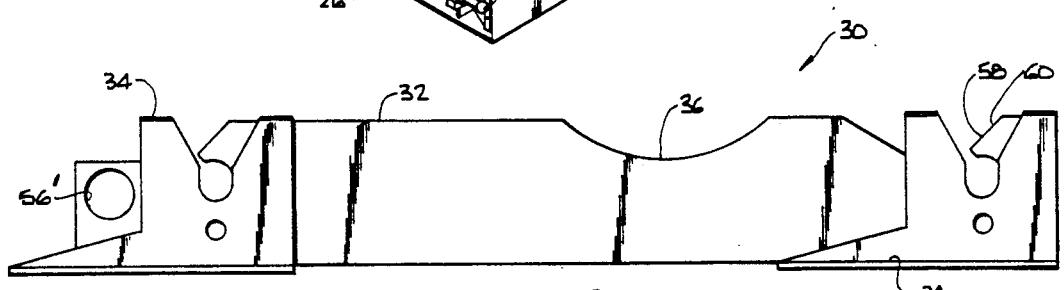
FIG. 2 is a side elevation of the latching mechanism of the cage in FIG. 1, showing the latch in the closed position.
Figure 3:
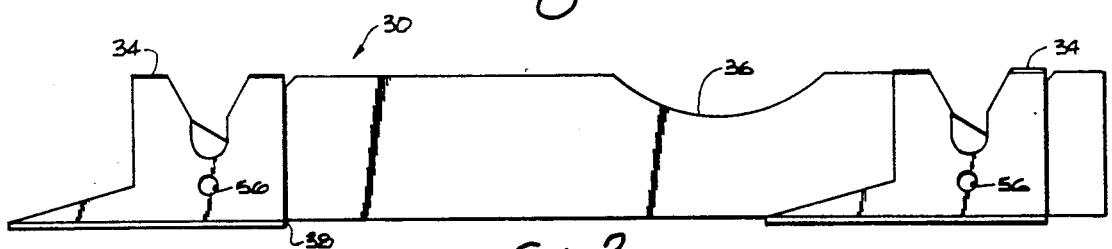
FIG. 3 is an elevation of the latch in the open positon.

Referring to FIG. 2, there is shown the latch 30 in greater detail in the closed position. The latch 30 further comprises the latch bar 32 and two door latch guides 34. The latch bar 32 includes a handle means 36, which may be an arcuate detent in the outwardly projecting edge of the latch bar 32, which allows the user to open the cage door 22 easily by pushing the latch bar 32 with a forearm, shoulder, and so forth, allowing the user to open the door without his hands. The latch 30 is shown in the open position in FIG. 3.

Figure 4:
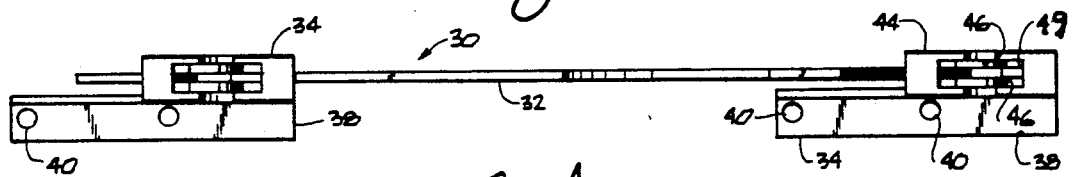
FIG. 4 is a top plan view of the latch mechanism in the closed position.

Referring to FIG. 4, the door latch guides 34 include a flat flange portion 38 which includes two apertures 40 for mounting the latch 30 on the edge of the second side wall 16. Conventional fasteners such as screws or rivets 42 (FIG. 1) secure the latch 30 to the cage 10.

Still referring to FIG. 4, in one embodiment the latch bar 32 is spaced from the bracket portion of the guides 34 by a pair of bushings 46, for providing quiet operation of the latch. The bushings 46 are made from nylon, or other sound absorbing or deadening material. In the preferred embodiment, the bushings 46 are made of acetal. Because the latch bar 32 and the door latch guides 34 are made from stainless steel, in operation the latch 30, is quite noisy, because the latch provides unwanted sounds when the door 22 is opened or closed, or shaken. The sounds are produced when the latch bar 32, the door latch guides 34, the rivets 56, the latching pins 28 and the cage 10 impinge on one another. The use of a softer nonmetallic bushing material for bushings 46 greatly reduces the noise encountered in opening and closing the door 22 and the noise the animals may generate by rattling the cage doors.

Figures 9, 10, 11, 12:
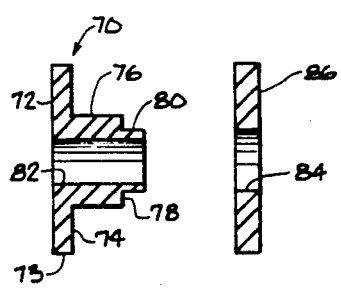
FIG. 9 is a plan view of one embodiment of a bushing within the latch mechanism.
FIG. 10 is a side elevation of the bushing of FIG. 9.
FIG. 11 is a side elevation of a preferred embodiment of a bushing.
FIG. 12 is a side elevation of a washer for use in conjunction with the bushing of FIG. 11.

Referring to FIGS. 9 and 10, there is shown the bushing 46 comprising a washer portion 48 of circular shape and a cylindrical portion 50 having a diameter smaller than that of the washer portion 48. The washer portion 48 and the cylindrical portion 50 comprise superposed concentric circles in plan view (FIG. 9) having a central aperture 52 therethrough concentric with the washer 48 and cylindrical portion 50. As illustrated, the washer is a single unitary structure made from nylon.

Again referring to FIG. 4, the bushings 46 are oriented with the smaller diameter cylindrical portion 50 facing inward toward the latch bar 32, which includes a pair of slots 54 (see FIG. 5) for receiving a rivet 56 (see FIG. 3) or other suitable fastener that holds in place the sandwich consisting of two inwardly facing bushings 46, the outer walls of the bracket portion 44 of the door latch guides 34 through the apertures 45, (one on each side of the bracket 44), and, in the middle, the latch bar 32.

Referring to FIG. 11, there is shown an alternative and preferred double-stepped bushing 70 which is formed of a solid sound-deadening material such as nylon, or preferably acetal. The double-step bushing 70 includes a large diameter circular washer portion 72, a step 74 that falls to a reduced diameter sleeve 76, which extends to the second step 78. The second step 78 falls to the still smaller diameter circular washer-engaging pin 80. Each of the three longitudinal portions of the double-step bushing 70, i.e., the outer surface 73 of the washer portions 72, the sleeve 76, and the washer-engaging pin 80, comprises a cylinder. A central aperture 82 penetrates the whole length of the double-step bushing 70 along its longitudinal central axis. When viewed from a plan view, the three cylindrical portions appear as concentric superposed circles.

Referring to FIG. 12, there is shown the washer 86 having a cylindrical aperture 84 therethrough. The aperture 84 is slightly larger than the outside diameter of the washer-engaging pin 80 portion of the double-step bushing 70, so that the washer 82 can be pressed onto the pin 80.

The apertures 82, 84 are both large enough to accommodate the shaft of the rivet 56. During assembly of the latch 30 of the animal cage 10, the double-step bushing 70 is inserted into the slot 54 of the latch bar 32 and the washer, also preferably made of acetal, is pressed onto the washer-engaging pin 80 portion of the bushing 80. Frictional engagement holds the two pieces together. Then the door latch guide 34 is positioned over the latch bar 32 while the rivet 56 is inserted through the apertures 45, 82, 84 and flattened or expanded as appropriate, to permanently couple the components together.

Figure 5:
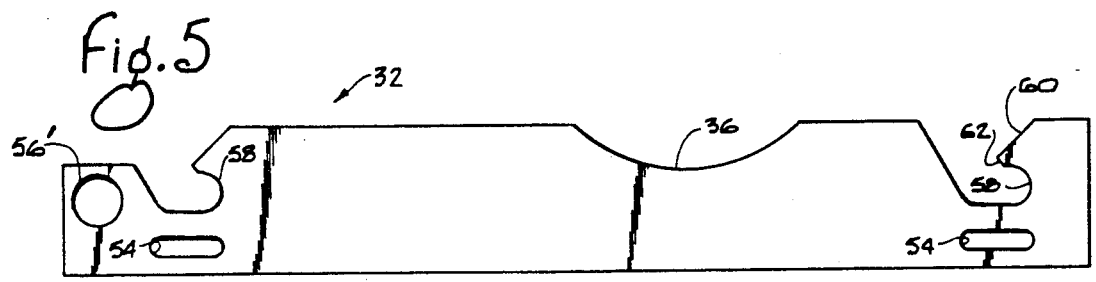
FIG. 5 is a side elevation of a latch bar.

Referring to FIG. 5, there is shown a side elevation of the latch bar 32, including the slots 54 and the aperture 56', which may be used for securing the cage door 22 in a closed position by inserting a pin or padlock through it. The pin or lock will prevent the latch bar 32 from being moved up as shown in FIG. 1 enough to unlatch the door 22 (see also FIG. 2).

Also illustrated in FIG. 5 are the two hook portions 58, which engage and retain the latching pins 28. The hook portions 58 further include a straight-line inclined portion 60 for facilitating engagement of the latching pins 28 with the hook portion 58. The latching pins 28 ride along the inclined portions 60, translating a force against the latch bar 32 that is directed into the second side wall 16 into a force having a vertical component, which causes the latch bar 32 to rise to the point that the latching pins 28 ride over the crest 62 of the hook portion 58, at which point the latch bar 32 falls downward by a small amount. Then the latching pins 28 are engaged in the right-hand portion of the hook portions 58, locking the door.

Figures 6, 7, 8:
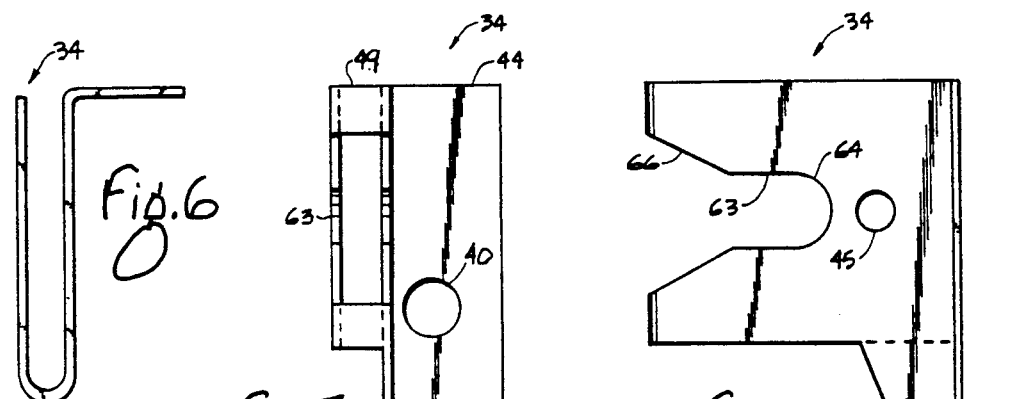
FIG. 6 is an end elevation of a door latch guide.
FIG. 7 is an end elevation of the door latch guide within the latch mechanism.
FIG. 8 is a front elevation of the door latch guide.

Referring to FIG. 8, the door latch guides 34 further include a notch 63 having a U-shaped channel portion 64 that terminates in a semicircular pattern, and a wider latching pin receiving Y-shaped portion 66, which allows the latching pins 28 to settle into the U-shaped channel portion 64 more easily. The triangular shaped end flange 68 allows wider spacing of the fasteners 40, providing greater strength in the attachment of the door latch guides 34 on the cage. The bracket 44 of the door latch guide 34 includes horizontal top slots 49, which permit assembly of the latch 30, see FIG. 4.

It is to be understood that while certain forms of this invention have been illustrated and described, in the best mode currently known to the inventor has been disclosed, the invention is not limited thereto, except insofar as such limitations are included in the following claims.

Having thus described the invention, what is claimed as new and desired to be secured by Letters Patent is:

1. A latch arrangement for animal containment cages comprising:
    a) upper and lower latch guides respectively having spaced side walls forming through channels, inlets for receiving a latching pin, and bushings;
    b) an elongate latch bar extending between and through said channels of said upper and lower guides and having opposite ends, each with a hook portion for extending over respective said inlets and trapping said latching pin thereunder, and a slot having a long axis extending parallel to the long axis of said elongate latch bar;
    c) said bushings respectively extending between said guide sidewalls, transversely to said channels and through said slot for reciprocal sliding of said latch bar relative to said latch guides; and
    d) sound deadening, resilient material extending about said bushings and through said slots whereby said latch bar quietly impinges on said bushings as said latch bar moves with respect to said latch guides.

2. The latch as claimed in claim 1 wherein said bushings respectively have a cylindrical portion and a concentric superposed washer portion, said washer portion having a greater diameter than said cylindrical portion, a concentric aperture through both said bushing portions, said bushing portions consisting of a unitary structure.

3. The latch as claimed in claim 2 wherein said bushings have a washer-engaging pin portion having a diameter smaller than said cylindrical portion and concentric therewith.

4. The latch as claimed in claim 1 wherein said bushings respectively have a washer portion, a sleeve portion and a washer-engaging pin portion, said portions comprising superposed concentric cylinders and having a central longitudinal aperture therethrough, and a washer having a central aperture therethrough of slightly greater diameter than the outside diameter of said washer-engaging pin portion of said bushings.

5. The animal cage as claimed in claim 1 wherein said bushings are of nylon.

* * * * *